United States Patent [19]

Uriu et al.

[11] Patent Number: 5,448,720
[45] Date of Patent: Sep. 5, 1995

[54] INFORMATION PROCESSING SYSTEM FOR OBTAINING STATUS DATA OF A SIMPLEX SYSTEM BY A STANDBY SYSTEM OF A DUPLEX SYSTEM

[75] Inventors: Shiro Uriu; Shuji Yoshimura; Yoshihiro Uchida, all of Kawasaki, Japan

[73] Assignee: Fujitsu Limited, Kanagawa, Japan

[21] Appl. No.: 940,248

[22] Filed: Sep. 4, 1992

[30] Foreign Application Priority Data

Sep. 5, 1991 [JP]  Japan ................. 3-225568

[51] Int. Cl.[6] .................. G06F 11/20; H04J 1/16; H04J 3/14
[52] U.S. Cl. ...................... 395/728; 370/16
[58] Field of Search .......... 371/8.1, 8.2, 11.2, 371/7, 11.1; 370/16; 395/575

[56] References Cited

U.S. PATENT DOCUMENTS

| | | | |
|---|---|---|---|
| 4,477,895 | 10/1984 | Casper et al. | 370/16 |
| 4,713,811 | 12/1987 | Frey | 371/8.2 |
| 4,774,703 | 9/1988 | Force et al. | 370/16 |
| 4,989,130 | 1/1991 | Moriyama et al. | 395/775 |
| 5,056,090 | 10/1991 | Kubota | 371/8.2 |
| 5,081,619 | 1/1992 | Nagata | 370/13 |
| 5,103,220 | 4/1992 | Brünle | 340/825.8 |
| 5,229,990 | 7/1993 | Teraslinna | 370/60 |
| 5,239,537 | 8/1983 | Sakauchi | 370/16 |
| 5,271,001 | 12/1993 | Hadano | 370/16 |
| 5,345,438 | 9/1994 | Ozaki | 370/16 |

Primary Examiner—Robert W. Beausoliel, Jr.
Assistant Examiner—Phillip F. Vales

[57] ABSTRACT

An information processing system includes a simplex system and a duplex system in which at least two data transmitting systems are provided each capable of being an act system or a standby system. Each data transmitting system has a data acquiring unit. The simplex system includes a controller for controlling a selector to switch between the systems. When in a standby condition, the data acquiring unit of the respective data transmitting system in the duplex system issues an access request signal to a switching signal generating unit provided in the controller of the simplex system to request that the output of the selector be switched from the act system to the standby system in the duplex system. Upon receipt of the access request signal from the data acquiring unit in the standby system, the switching signal generating unit switches the selector to the standby system. As a result, status data acquired by the data acquiring unit in the simplex section is output to the data acquiring section in the standby system. The duplex system uses the status data to make a diagnosis of the standby system for its normality.

6 Claims, 6 Drawing Sheets

INFORMATION PROCESSING SYSTEM FOR OBTAINING STATUS DATA OF A SIMPLEX SYSTEM BY A STANDBY SYSTEM OF A DUPLEX SYSTEM

BACKGROUND OF THE INVENTION

The present invention relates to an information processing system having a simplex system and a duplex system, and more particularly to a device for acquiring status data of the simplex system from a standby system in the duplex section.

An information processing system, such as an exchange system, has a duplex system and a simplex system. With such a configuration, supposing one of two systems of the duplex system to be a 0 system and the other to be a 1 system, a controller produces a signal (called an act signal) indicating which of the two systems is an act system (a system in use) or a standby system (a system on standby). The act signal is applied to various processing units so as to manage redundant configuration. The duplex system is equipped with a maintenance data acquisition section for each of the systems so as to accommodate switching between the act and standby systems.

FIG. 1 illustrates a block diagram of a prior art system. In this figure, 10 denotes a simplex system which is equipped with a line circuit such as a subscriber's line (or transmission line), 11 denotes the line circuit, 12 denotes a line data acquiring section or units which acquires and holds status data indicating the status of the simplex system, 13 denotes a first selector (SEL1) which switches the transmission line to the 0 system or the 1 system in a duplex system, 14 denotes a second selector (SEL2) which switches the line data acquiring section or unit 12 to either of management data acquiring units for the 0 and 1 systems, 15 denotes a controller which controls the selectors 13 and 14, and 16 to 19 denote sections or units constituting the duplex system. The sections or units 16 and 17 are 0- and 1-system line accommodating sections or units (including multiplexing/demultiplexing circuits) connected to the simplex system, and the units 18 and 19 are 0- and 1-system data acquiring or units, connected to the 0- and 1-system line accommodating or units, which acquire status data from corresponding line accommodating sections 16 and 17 and apply necessary data. Though not shown, a duplex switching system is similarly connected on the right side of the line accommodating or units 16 and 17.

In such an arrangement, upon receipt of an act (ACT0) signal at, for example, a low level from the 0-system data acquiring or units 18, the switching controller 15 generates a switching control signal to thereby switch the first and second selectors 13 and 14 to the 0 system. In response to an act (ACT1) signal at a low level from the 1-system data acquiring section or unit 19, on the other hand, the controller 15 switches the first and second selectors 13 and 14 to the 1 system.

In this system configuration, the act-system data acquiring section or unit and the standby-system data acquiring section or unit acquire status data from their respective corresponding line accommodating sections or units (16 or 17).

It should be noted that the term "section" used throughout the specification means a unit or circuit carrying out the respective function associated therewith as disclosed in the specification.

The act-system data acquiring section thus acquires various failure data and supplies them to software (another controller not shown) as deciding factors for the normality of the act system. As a result, the software makes a decision as to whether or not switching between the systems in the duplex system is needed. For this reason, the 0- and 1-system data acquiring sections 18 and 19 for acquiring failure data are respectively provided to correspond to the 0 and 1 systems.

The act-system data acquiring section (18 or 19) in the duplex system takes the status of the simplex system 10 out of the line data acquiring section 12 via the second selector 14 to thereby understand the status of the simplex system 10.

Supposing that, in the duplex system, the 0 system is operating as the act system and if this 0 system fails, immediate switching from the 0 system to the 1 system is required. In order to make this switching, a diagnosis must be made beforehand as to whether or not the standby system is in the normal state. After verification that the standby system is normal, it can be switched to a new act system whenever a failure occurs in the old act system. In order to make that diagnosis, it is necessary for the data acquiring section in the standby system to hold data indicating the current status of the data acquiring section in the simplex system.

Specifically, in order to make a diagnosis as to whether or not the standby line accommodating section (17 when the 1 system is on standby) in the duplex system can operate properly, it is necessary for the corresponding data acquiring section (19 when the 1 system is on standby) to acquire data from the line data acquiring section 12 in the simplex system 10.

With the prior art system, however, the switching control section 15 controls the selectors 13 and 14 so that they are continually connected to the act system, which does not permit the data acquiring section 18 (or 19) to acquire status data of the simplex system 10.

For this reason, heretofore, the system switching has been made without making a diagnosis of whether or not the standby system operates normally. With such system switching, in case where the standby system is faulty, both of the failing 0 and 1 systems will bring the system down immediately after the switching from the act system to the standby system.

SUMMARY OF THE INVENTION

It is an object of the present invention to permit a standby data acquiring section in a duplex system to acquire status data of a simplex system so as to verify the normality of the standby system in the duplex system.

A feature of the present invention resides in an information processing system including a simplex system having a data processing section and a data acquiring section for acquiring status data indicating the status of that data processing section and a duplex system having act and standby systems each having a duplex data processing section and a data acquiring section.

The simplex system has first and second selectors. The first selector outputs an output signal of the data processing section in the simplex system to one of the data processing sections in the duplex section, while the second selector outputs status data acquired by the data acquiring section in the simplex system to one of the data acquiring sections in the duplex system.

Each of the data acquiring sections in the duplex system has an access request unit which issues to the simplex system an access request to switch the second selector to its system. The access request unit, when its system is the standby system, issues an access request to the simplex system to switch the second selector to the standby system. Thereby, the data acquiring section in the standby system is allowed to acquire the status data of the simplex system. The status data of the simplex system can be used to make a diagnosis of whether or not the data processing section in the standby system operates properly.

BRIEF DESCRIPTION OF THE DRAWINGS

One of skill in the art can easily understand additional features and objects of this invention from the description of the preferred embodiments and some of the attached drawings. In the drawings.

DETAILED DESCRIPTION OF THE PREFERRED EMBODIMENT

Figure 2:
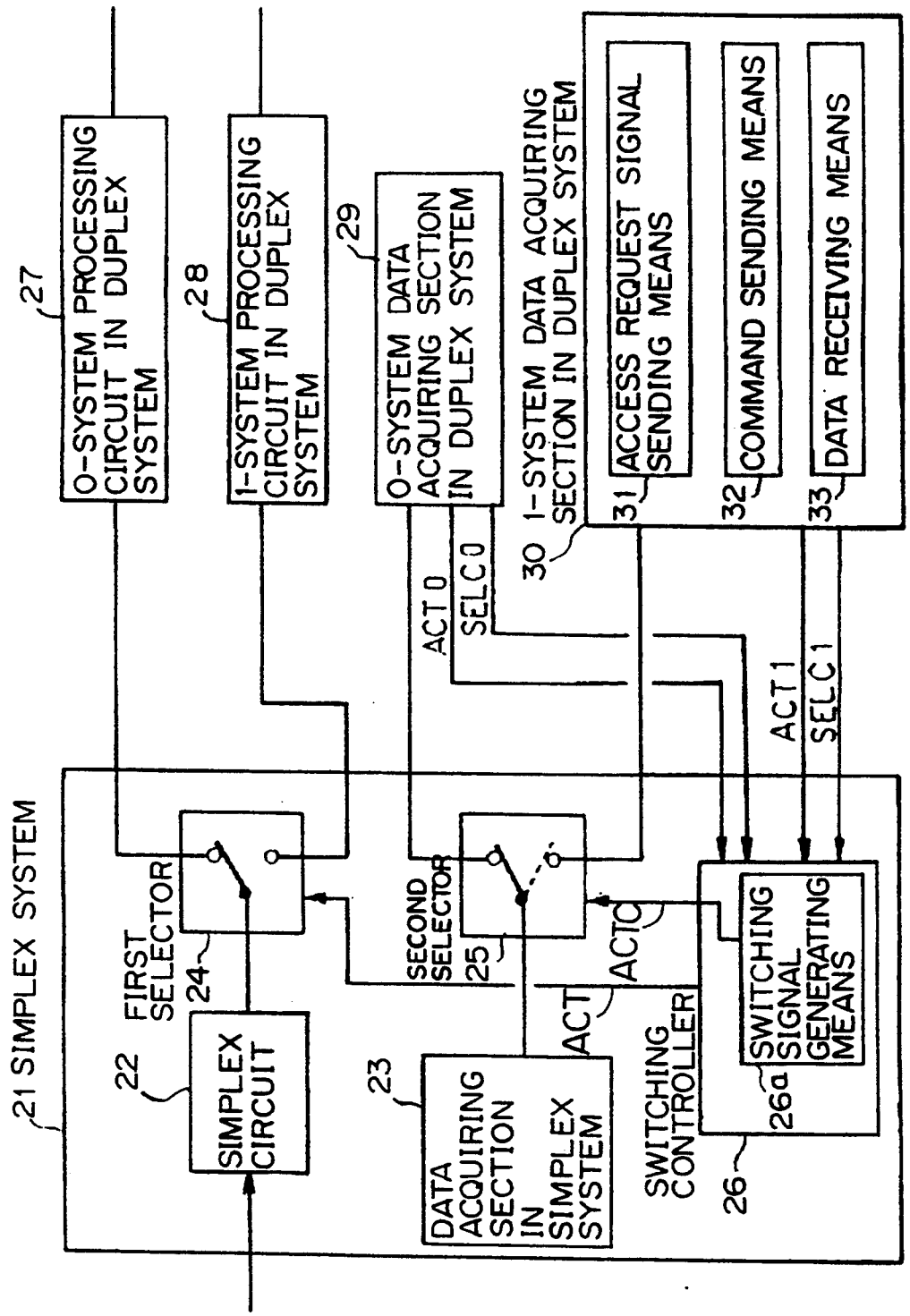
FIG. 2 is a basic block diagram of an embodiment of the present invention.

Referring now to FIG. 2, there is illustrated a basic arrangement of the present invention which comprises a simplex system and a duplex system. In this figure, 21 denotes a simplex system, 22 denotes a simplex circuit, such as a line circuit, which accommodates a transmission line, 23 denotes a data acquiring section in the simplex system, 24 denotes a first selector, 25 denotes a second selector, 26 denotes a switching control circuit, 27 and 28 denote processing circuits in a duplex system which perform multiplexing and demultiplexing of 0 and 1 systems, and 29 and 30 denote 0- and 1-system data acquiring sections which are respectively provided to correspond to the 0- and 1-system processing circuits 27 and 28.

The data acquiring sections 29 and 30 have the same arrangement. Assume that the 0 and 1 systems are operating as act and standby systems, respectively. FIG. 2 illustrates the internal arrangement of the data acquisition section 30 in the standby system. That is, each of the data acquiring sections 29 and 30 is equipped with an access request signal generating means for switching the second selector, and correspondingly the switching control section 26 in the simplex system 21 is equipped with a switching signal generating circuit 26a which, upon receipt of an access request signal, temporarily switches the second selector 25 from the act system to the standby system.

In the present invention, the data acquiring section in the simplex system is connected to the act-system data acquiring section through the selector controlled by an act signal, and the switching control circuit responds to transmission of an access request signal from the standby-system data acquiring section to temporarily connect the data acquiring section in the simplex system to the standby-system data acquiring section, thereby permitting the standby system to make access to the data acquiring section in the simplex system.

Suppose now that the 0-system signal processing circuit 27 in the duplex system is generating an act signal (ACT0). In this case, the switching control section 26 generates switching control signals (ACT, ACTC) so that the first and second selectors 24 and 25 are placed to the positions shown to select the 0 system, and the switches of the first selector 24 and second selector 25 are set to the state shown in FIG. 2 (connected to the 0-system). Under this condition, the simplex circuit 22 in the simplex system 21 is connected to the 0-system processing circuit 27 through the first selector 24, and the data acquiring section 23 in the simplex system is connected to the 0-system data acquiring section 29 through the second selector 25. The data acquiring section issues a command to receive required status data from the data acquiring section 23 in the simplex system 21. The status data in the simplex system refers, for example, in the case of an exchange system, to line failure information, and information on failures in the simplex circuit 22 and its subordinate devices.

When status data of the simplex system required to make a diagnosis of whether or not the processing circuit 28 in the 1 system on standby is normal is taken out, the access request signal sending means 31 in the data acquiring section 30 in the 1 system on standby sends an access request signal (SELC1, in which case 1 indicates the 1 system) to the switching control section 26. This access request signal SELC1 is sent prior to transmission of a command which instructs the data acquiring section 23 in the simplex system to transmit data.

Upon receipt of the access request signal SELC1, the switching control section 26 instructs the switching signal generating means 26a to output a switching signal (ACTC) for switching the second selector 25 to the standby system (in this case the 1 system). Thereby, the second selector 25 is switched to the standby system as shown dotted.

The standby data acquiring section 30 causes the command sending means 32 to send a command after a lapse of a certain time from the transmission of the access request signal. The command includes an instruction to transfer necessary data.

upon receipt of that command, the data acquiring section 23 in the simplex system transmits required data to the data acquiring section 30 on standby in the duplex system, which receives that data via a data receiving means 33 and stores it. The switching control section 26 stops switching the switching signal generating means 26a to return the second selector 25 to its original state (the state in which it is connected to the act system) at a time when transmission and reception of data terminate.

Figure 1:
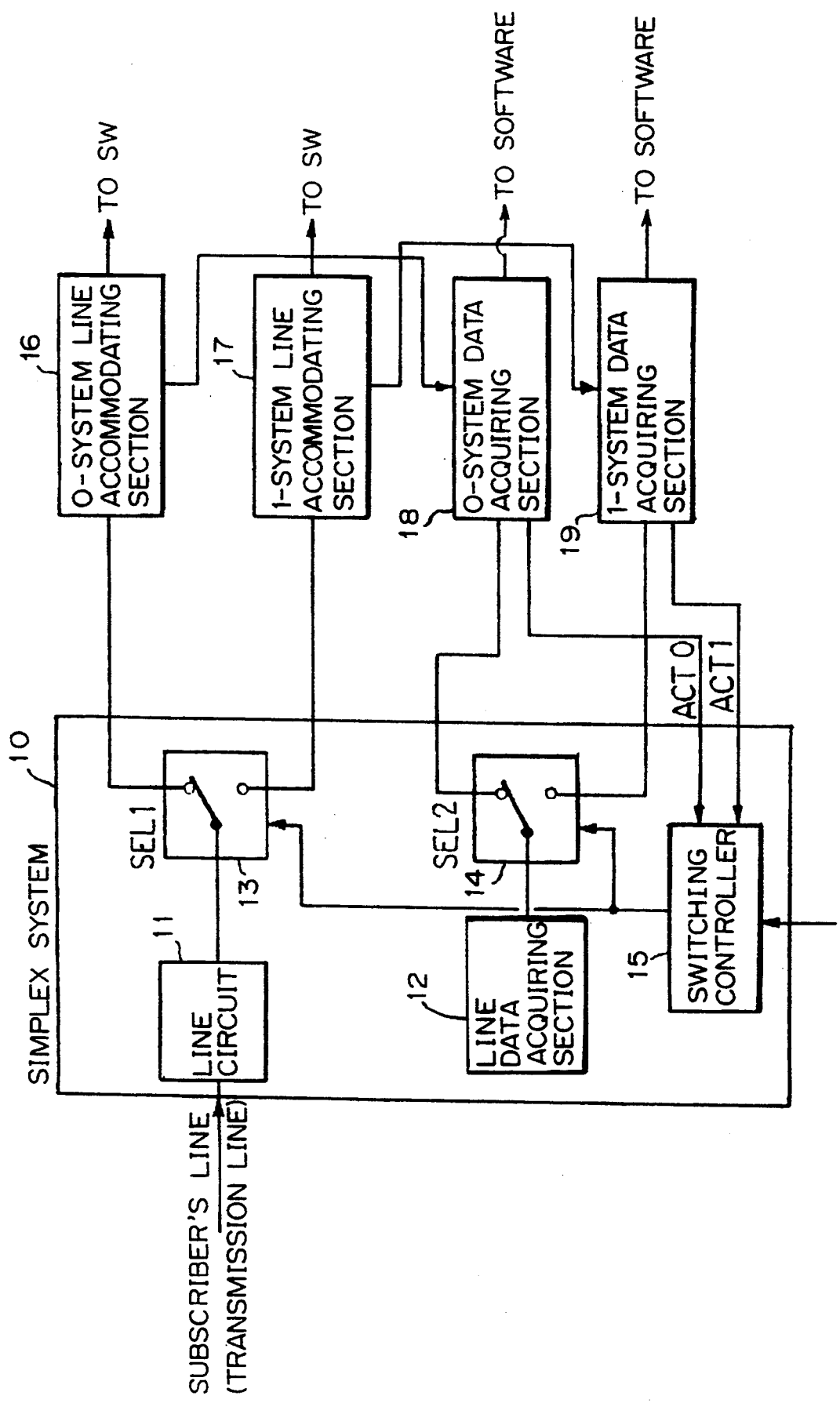
FIG. 1 illustrates a block diagram of a prior art system.
Figure 3:
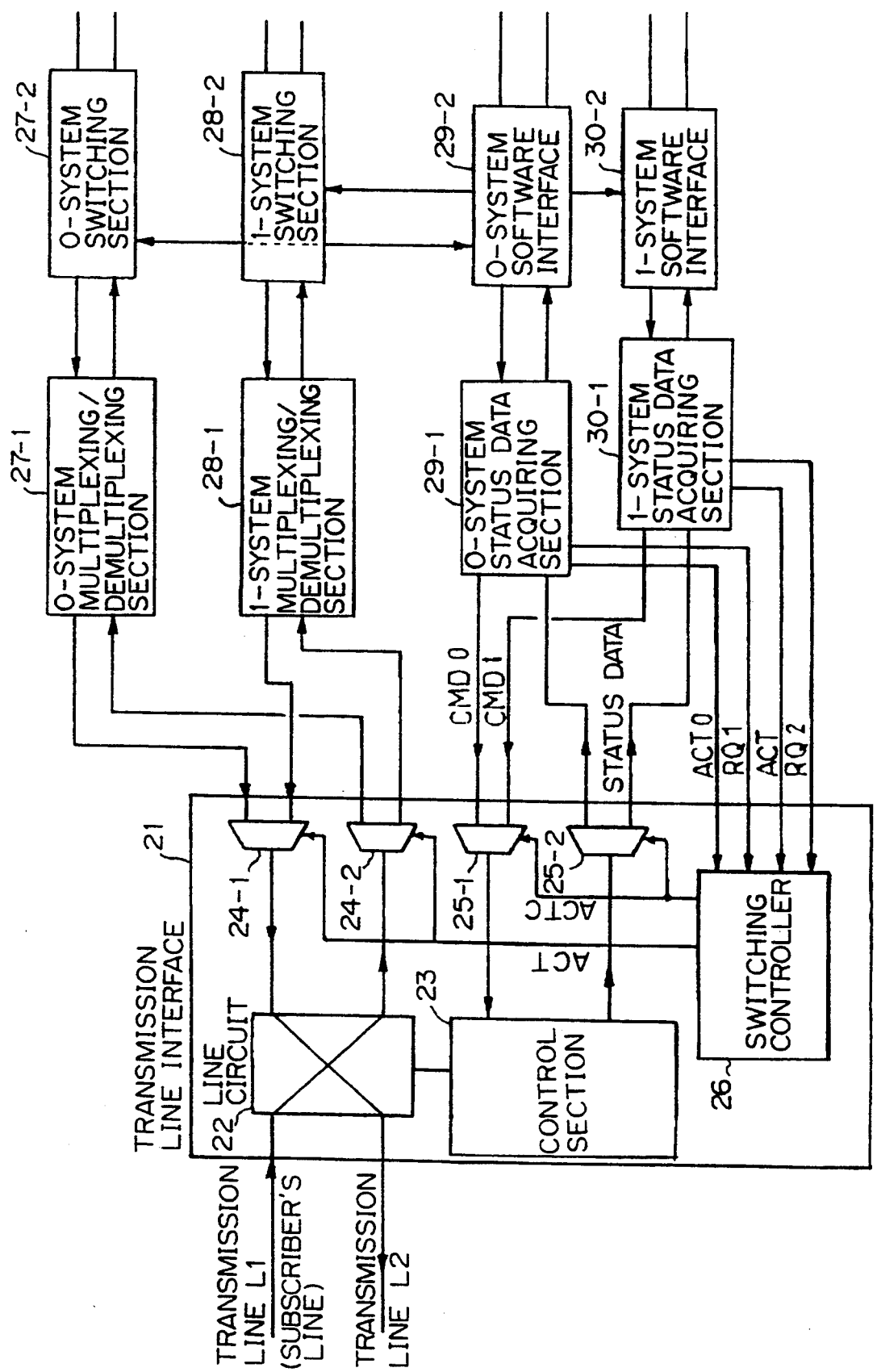
FIG. 3 is a detailed block diagram of the embodiment shown in FIG. 2.

FIG. 3 illustrates an example of a more specific system configuration of the embodiment shown in FIG. 2, which corresponds to a part of a digital exchange system. In FIG. 3, 21 denotes a transmission line interface corresponding to the simplex system of FIG. 2, 22 denotes a line circuit, 23 denotes a control section which holds status data of the line circuit, 24-1 and 24-2 respectively denote a selector which selects a down transmission signal out of the act system in the duplex system and a selector which outputs an up transmission signal to the act system in the duplex system, both the selectors 24-1 and 24-2 corresponding to the first selector 24 of FIG. 2, and 25-1 and 25-2 respectively denote a selector which selects one of two commands from the duplex system and a selector which outputs status data to one system in the duplex system, both the selectors 25-1 and 25-2 corresponding to the second selector 25 of FIG. 2.

Reference numeral 26 denotes a switching control section, which is the same as the control section in FIG. 2, for generating a switching control signal ACT for the selectors 24-1 and 24-2 and a switching control signal ACTC for the selectors 25-1 and 25-2, 27-1 and 28-1 respectively denote 0- and 1-system multiplexing-/demultiplexing sections (which correspond to the processing circuits 27 and 28 in FIG. 2), 27-2 and 28-2 respectively denote 0- and 1-system switching sections, 29-1 and 30-1 respectively denote 0- and 1-system status data acquiring sections (corresponding to the data acquiring sections 29 and 30 in FIG. 2), and 29-2 and 30-2 respectively denote 0- and 1-system software interfaces which receive control signals from and transmit data (status data) to software connected to a controller not shown.

The transmission interface 21 accommodates a transmission line (subscriber's line) L1 for transmitting an upward signal and a transmission line (subscriber's line) L2 for transmitting a downward signal in the line circuit 22, applies the upward signal to the selector 24-2 and receives the downward signal via the selector 24-1. Interface signals between the selectors 25-1 and 25-2 and the switching control section 26 in the simplex system and the 0- and 1-system status data acquiring sections 29-1 and 30-1 in the duplex system will be described with reference to FIG. 4.

Figure 4:
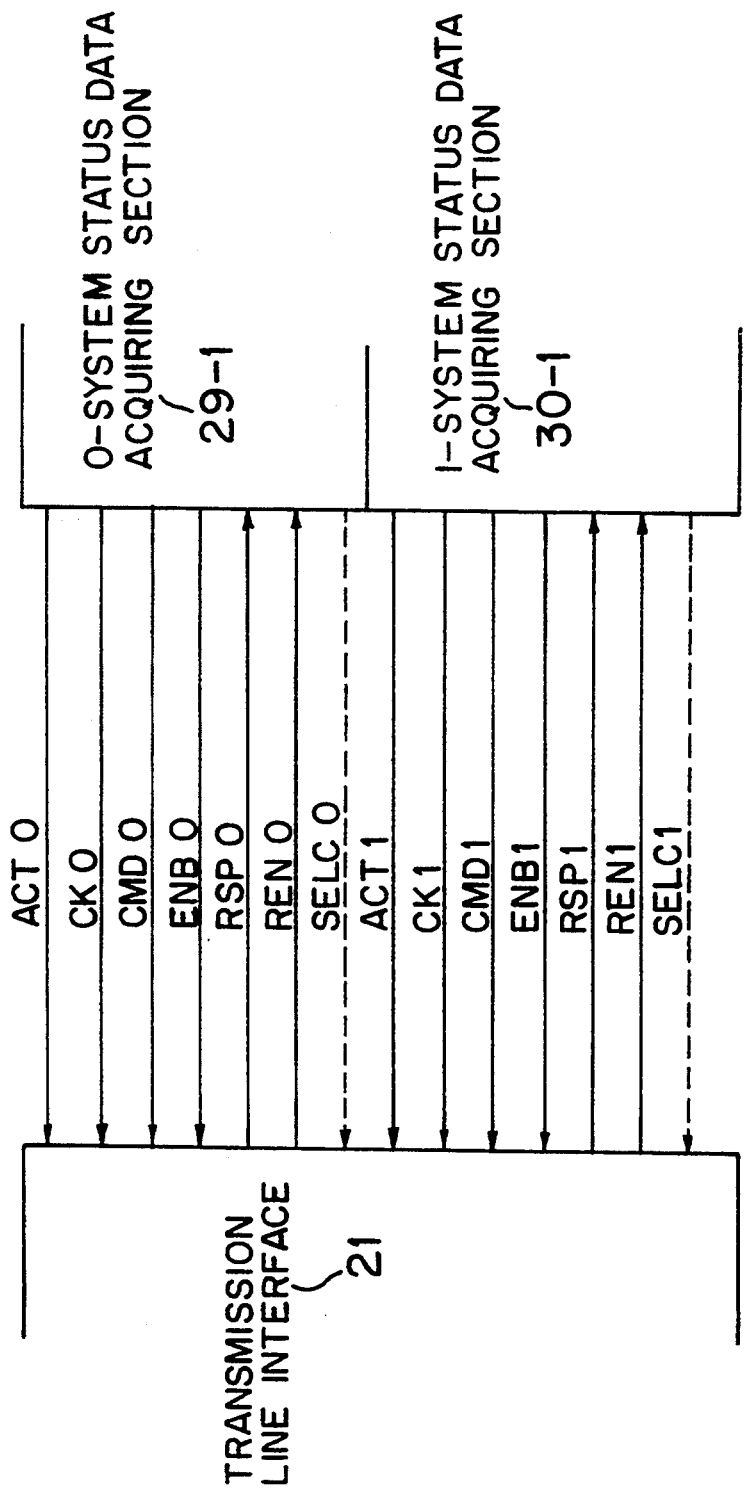
FIG. 4 illustrates interface signals between the simplex system and the duplex system shown in FIG. 3.

In FIG. 4, ACT0 and ACT1 are signals which are generated by the 0- and 1-system status data acquiring sections 29-1 and 30-1, respectively, for application to the switching control section 26 in the simplex system 1. When either of the signals ACT0 and ACT1 is high, the switching control section 26 switches the selectors 24-1 through 25-2 to the act system. CK0 and CK1 are the 0- and 1- system clock signals, CMD0 and CMD1 are commands generated by the 0 and 1 systems, and ENB0 and ENB1 are enable signals for the commands generated from the 0 and 1 systems.

The clock signals, commands, and enable signals are applied to the selector 25-1 in FIG. 3 (in which only the CMD0 and CMD1 are indicated). When either the 0 system or the 1 system is selected, they are applied to the control section 23. The clock signals are applied to other circuits as well.

RSP0 and RSP1 are responses (status data transmitted in response to receipt of a command) which are transmitted from the control section 23 in the simplex system to the 0 and 1 systems, and REN0 and REN1 are response enable signals for the 0- and 1-system. The responses RSP0 and RSP1 and the response enable signals REN0 and REN1 are sent from the selector 25-2 to the duplex system (in FIG. 3 only the status data are indicated).

SELC0 and SELC1 are access request signals which, when the 0- or 1-system status data acquiring section is on standby, are sent to the switching control section 26 so as to switch the selectors 25-1 and 25-2 in the transmission interface 21 to the standby system. The access request signals are prepared in accordance with the present invention.

Reference will now be made to FIG. 5, which is a timing diagram of the interface signals between the simplex and duplex systems, to describe the operation of the configuration shown in FIG. 3.

First, description will be made of the normal operation of transmission of status data, i.e., the transmission of status data from the control section 23 in the transmission interface 21 to the act-system status data acquisition section 29-1 (or 30-1).

Assuming now that the 0 system is the act system, the switching control section 26 outputs ACT and ACTC signals at a low level with the result that the selectors 24-1, 24-2, 25-1, and 25-2 are placed in the 0-system-selecting state.

Figure 5A:
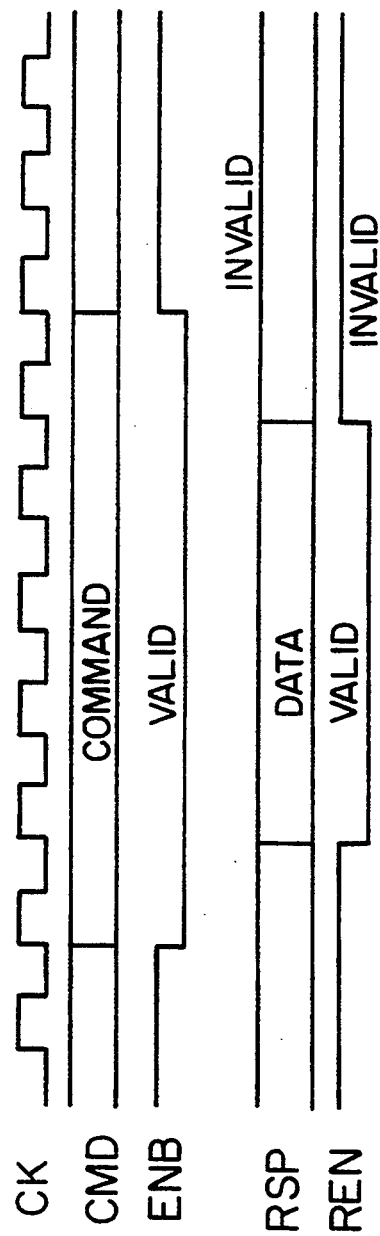
FIG. 5 is a timing diagram of the interface signals shown in FIG. 4.

In this state, when acquiring status data of the simplex system, the status data acquisition section 29-1 outputs to the selector 25-1 a clock signal CK, a command, and a command enable signal ENB as shown in FIG. 5A. At this point, since the selectors 25-1 and 25-2 select the 0 system in accordance with the ACTC signal at low level output from the switching control circuit 23, those signals are applied to the control section 23 via the selector 25-1.

Upon receipt of the command to request transmission of status data, the control section 23 outputs a response RSP, i.e., the status data indicating the status of the simplex system, and a response enable signal REN (valid at low level) to the selector 25-2. These signals are then applied to the act-system data acquiring section 29-1 via the selector 25-2.

Thus, the act-system data acquiring section 29-1 can collect the status data in the duplex system, and outputs the status data of the simplex system to a fault diagnostic control device (not shown) via the software interface 29-2, thereby permitting a check to be made as to whether or not the multiplexing/demultiplexing device 27-1 and the switching section 27-2 operate properly.

Next, the acquisition of status data of the simplex system by the status data acquisition section on standby will be described.

Assume now that the 0 system is the act system and the 1-system is the standby system. When commanded to acquire status data of the simplex system by the software interface 30-2, the 1-system data acquisition section 30-1 on standby outputs an access request signal SELC1 at a low level to the switching control section 26. Upon receipt of the access request signal SELC1, the switching control section 26 causes the ACTC signal to go high, so that the selectors 25-1 and 25-2 are switched to the 1 system on standby.

Figure 5B:
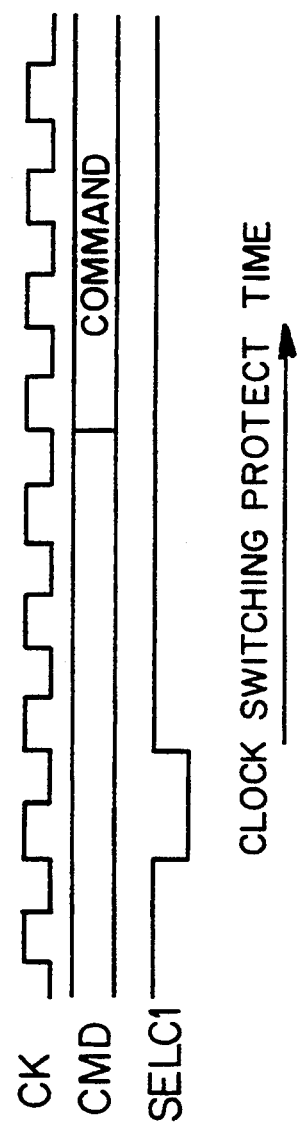

After a lapse of a clock switching protect time corresponding to several clock periods from the time the access request signal SELC1 was output, the 1-system status data acquiring section 30-1 issues a status data transmission requesting command to the selector 25-1 as shown in FIG. 5B.

The reason why the status data transmission requesting command is issued after a lapse of a clock switching protect time from the time the access request signal SELC1 was output is that, when the selectors 25-1 and 25-2 are switched from the act system to the standby system, the clock signal to be applied to the simplex system is also switched from the act-system clock signal CK0 to the standby-system clock signal CK1, and this may cause unstable circuit operations. That is, the 1-system data acquiring section 30-1 is forced to wait for the issue of the transmission request command until a fixed amount of time elapses, i.e., until circuit operations become stable.

When the transmission request command is issued, the selectors 25-1 and 25-2 have been switched to the 1 system on standby. Thus, it is entered into the control section 23 via the selector 25-1.

Upon receipt of the status data transmission request command, the control section 23 outputs the response RSP, or the status data indicating the status of the simplex system, and the response enable signal REN (valid at a low level) to the selector 25-2. Thereby, the status data of the simplex system is fed into the status data acquiring section 30-1 in the standby system via the selector 25-2.

The status data acquiring section 30-1 on standby outputs the acquired status data of the simplex system to the control device via the software interface 30-2. The control device makes a diagnosis of whether or not the multiplexing/demultiplexing device 28-1, the switching section 28-2 and so on in the standby system operate properly.

In this way the standby-system status data acquiring section 30-1 is allowed to acquire the status data of the simplex system, and thus, prior to switching between the 1 and 0 systems, a check can be made as to whether or not the circuits in the standby system can operate properly.

Further, according to the present embodiment, since a command to request transmission of status data is sent from the data acquiring section 30-1 (or 29-1) on standby in the duplex system to the simplex system via the selector 25-1, and the status data actually sent from the simplex system is used to diagnose the standby system, a check can be made for the normality of all the hardware involving the interface between the duplex system and the simplex system.

Figure 6:
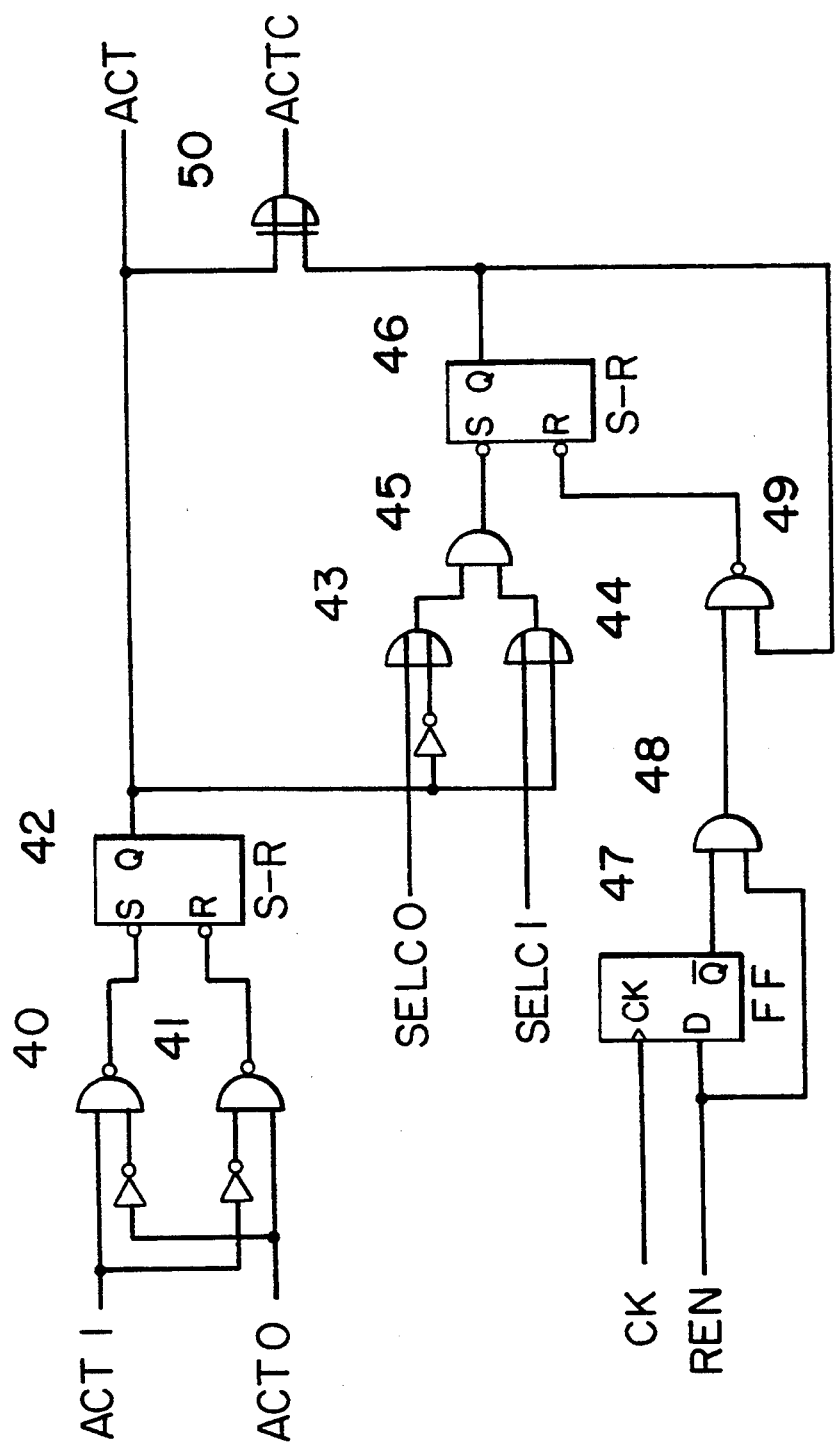
FIG. 6 illustrates a circuit arrangement of the switching control section shown in FIGS. 2 and 3.

FIG. 6 shows a circuit arrangement of the switching control section. In this FIG., 40, 41, and 49 denote NAND circuits, 43 and 44 denote OR circuits, 45 and 48 denote AND circuits, 50 denotes an exclusive OR circuit, 42 and 46 denote RS flip-flops, and 47 denotes a D flip-flop. The RS flip-flops 42 and 46 can be replaced with JK flip-flops.

When the output signal ACT of the switching control section, serving as a switching signal for the selectors 24-1 and 24-2, is at a low level, the selectors are switched to the act system, and when it is at a high level, they are switched to the standby system. When the output signal ACTC, serving as a switching signal for the selectors 25-1 and 25-2, is at a low level, they are switched to the act system, and when it is at a high level, they are switched to the standby system.

Supposing that the 0 system is operating as the act system in the duplex system, the ACT0 is high and the ACT1 is low, so that the NAND circuit 41 produces an output at a low level, resetting the flip-flop. 42. The flip-flop 42 causes its output Q to go low, that is, causes the ACT signal to go low, thereby selecting the act system (0 system).

In this case, when, of the access request signals SELC0 and SELC1 which are usually kept low, the signal SELC1 from the standby system (the 1 system) goes low, the output of the OR circuit 44 goes low, and the output of the AND circuit 45 goes low. This sets the flip-flop 46, so that its output Q goes high. This forces the output of the exclusive OR circuit 50 to go high with the result that the switching signal ACTC goes high. Thereby, the selectors 25-1 and 25-2 in FIG. 3 are switched to the standby system (the 1 system), thus permitting the status data acquiring section 30-1 in the standby system (the 1 system) to acquire status data of the simplex system.

On the other hand, the response enable signal REN is low while the response RSP (status data) is being transmitted from the control section 23 in the simplex system to the status data acquiring section (refer to FIG. 5A). Thus, the inverted output (complementary to the output Q) of the flip-flop 47 is high, and the output of the AND circuit 48 is low because its other input (REN) is low. The output of the NAND circuit 49 is high, so that the output Q of the flip-flop 46 remains high.

On termination of the transmission of the status data, the response enable signal REN goes high and thus the output of the AND circuit 48 goes high. Consequently, the output of the NAND gate 49 goes low, resetting the flip-flop 46 to the Q=Low state. Thus, the output of the exclusive OR circuit 50 goes low with the result that the switching signal ACTC is permitted to return from the standby system selecting state to the act system selecting state.

According to the embodiment described above, the status data acquiring section on standby in the duplex system is permitted to acquire status data of the simplex system by issuing an access request signal to the simplex system. Thus, a check can be made for normality of circuits for processing signals in the standby system using the status data acquired. In the event of a failure in the standby system, the failure can be detected before a switching operation (from the standby system to the act system or from the act system to the standby system) is performed, providing improved system reliability.

What is claimed is:

1. In an information processing system comprising:

a simplex system having a first data processing means and a first data acquiring means for acquiring status data indicating the status of said first data processing means, and a duplex system comprising first data transmitting system and a second data transmitting system each being capable of operating either as an act system or a standby system and each having a second data processing means and a second data acquiring means, said simplex system further comprising:

a first selector, coupled to said first processing means for outputting an output signal of said first data processing means of said simplex system to one of said second data processing means of said duplex system, and a second selector, coupled to said first data acquiring means, for outputting status data acquired by said first data acquiring means in said simplex system to one of said second data acquiring means in said duplex system, and each said second data acquiring means in said duplex system comprising:

an access request means for issuing to said simplex system an access request to switch an output of said second selector from said second acquiring means of the data transmitting system operating as the act system to said second acquiring means of the data transmitting system operating as the standby system so as to cause said second selector of said simplex system to be temporarily switched to the standby system of said duplex system and permit said second data acquiring means in the standby system to acquire status data acquired by said first data acquiring means of said simplex system.

2. The information processing system according to claim 1, in which said simplex system includes switching control means for switching said first and second selectors, said switching control means including switching signal generating means responsive only to said access request from said access request means to switch said second selector to the standby system, thereby permitting status data acquired by said first data acquiring means in said simplex system to be outputted to said second data acquiring section of the standby system in the duplex system.

3. The information processing system according to claim 2, in which said switching control means keeps said second selector switched to said second acquiring means of the standby system from receipt of the access request from said access request means of a respective second data acquiring means of said duplex system until transmission of status data to said second data acquiring means of the standby system terminates and, at the termination of the data transmission, switches said second selector to the data transmitting system operating as the act system in the duplex system.

4. The information processing system according to claim 2, in which said access request means of said second acquiring means of one of the data transmitting system, when it is operating as the standby system, issues said access request to switch said second selector to the standby system, to said switching control means and then sends a command for requesting transmission of status data to said first data acquiring section of said simplex system.

5. The information processing system according to claim 4, in which said simplex system includes a third selector for selectively sending one of the output signals of said second data processing means of said duplex system to said first data processing means of said simplex system, and a fourth selector for selectively sending one of the output signals of said second data acquiring means of said duplex system to said first data acquiring means of said simplex system, wherein said access request means of said second data acquiring means of the data transmitting system, which is operating as the standby system in the duplex system, issues to said switching control means of said simplex system an access request to cause said second and fourth selectors to be switched to the standby system and then sends a command to request transmission of status data acquired by said first data acquiring means of said simplex system through said fourth selector.

6. The information processing system according to claim 4, in which each of said second data acquiring means in said duplex system issues a command to request transmission of status data acquired in said simplex system after a lapse of a predetermined clock protect period from the issue of said access request to said switching control means.

* * * * *